Figure 3:
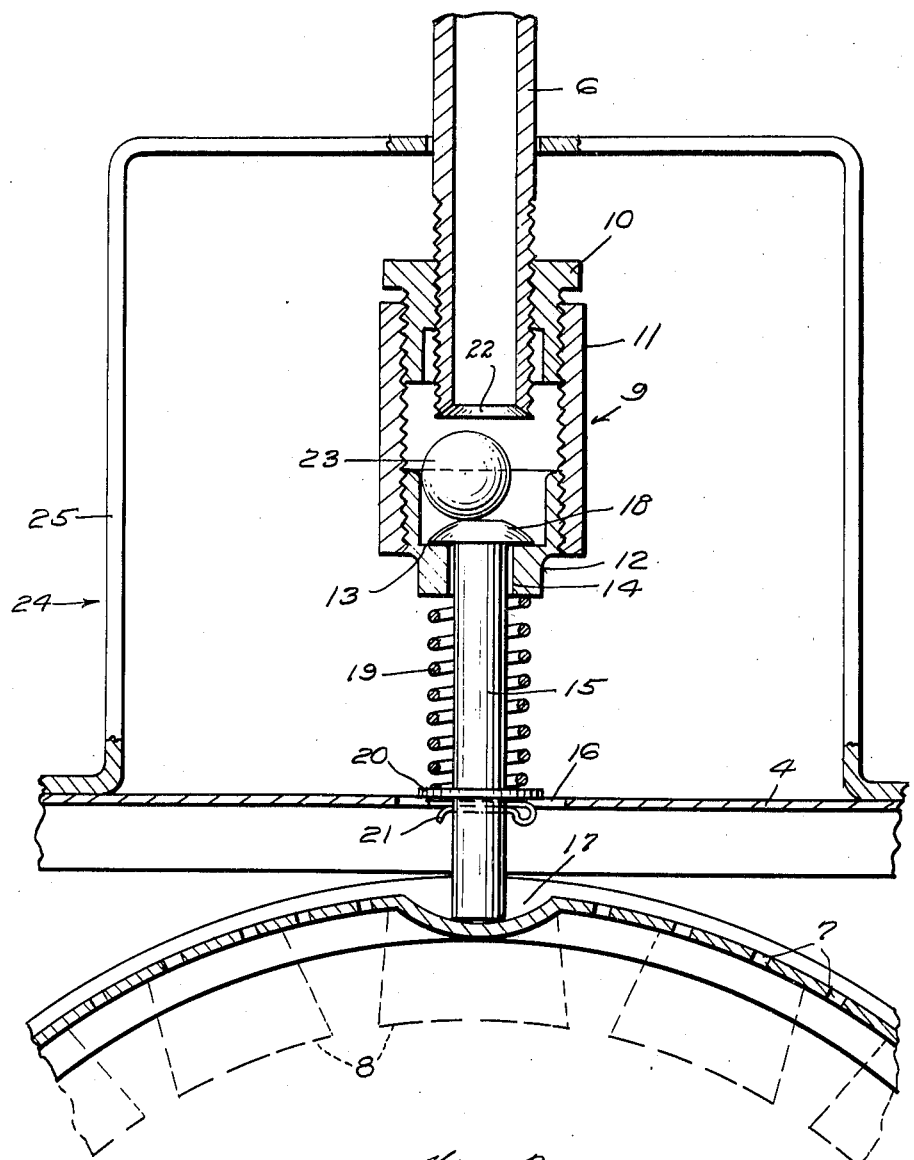

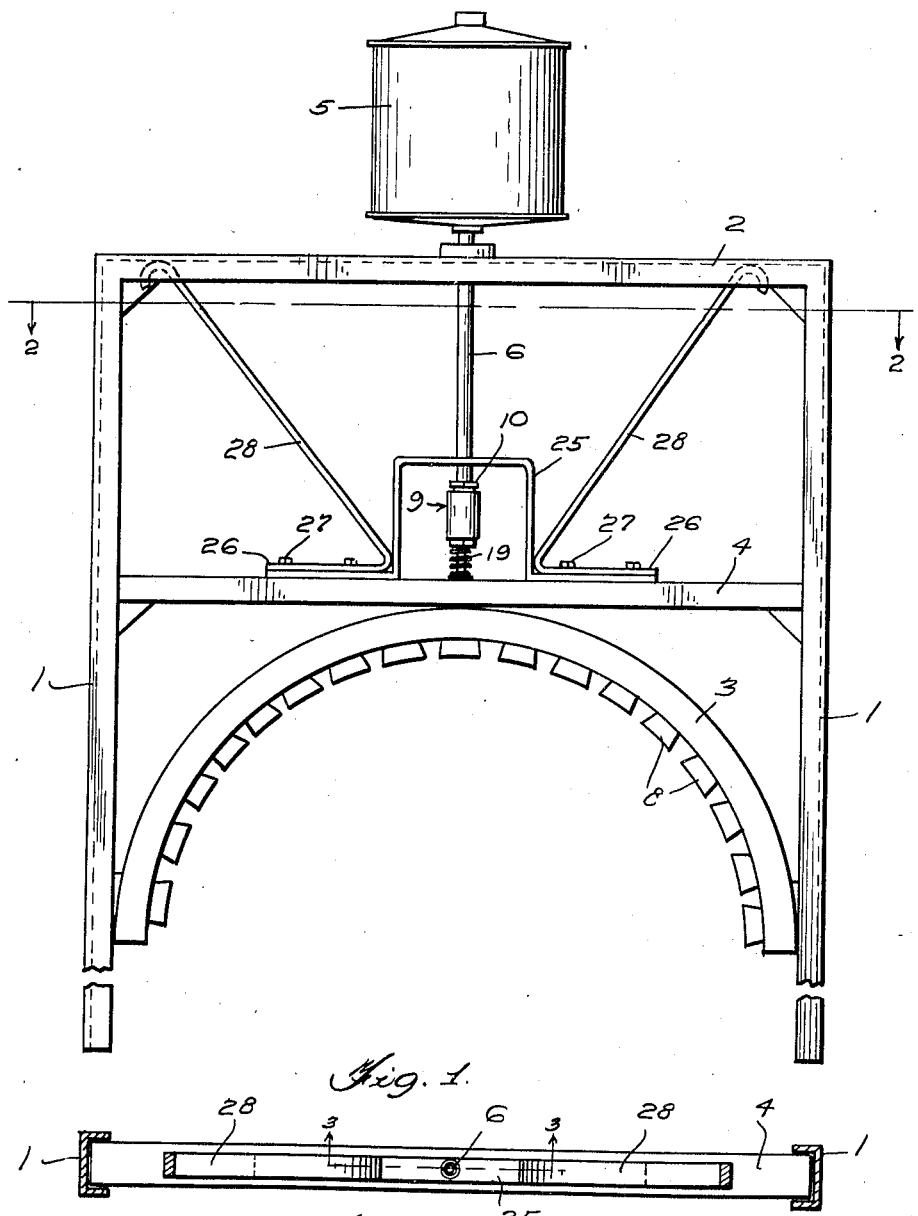

Patented Nov. 9, 1943

2,333,946

UNITED STATES PATENT OFFICE 2,333,946

ANIMAL SCRATCHING DEVICE

Ronald McQuistan, Pender, Nebr., assignor to Automatic Currying & Dipping Machine Company, Pender, Nebr., a corporation of Nebraska Application February 28, 1942, Serial No. 432,857

1 Claim. (Cl. 119—157)

My invention relates to animal back scratching devices of the type disclosed by United States Patent No. 1,581,544, dated April 20, 1926, and over which the instant invention is designed as an improvement.

The principal object of my invention is to provide such devices with an improved valve assembly preventing leakage and waste of oil dispensed in the device for lubricating the animals' backs.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in front elevation of a portion of an animal back scratching device embodying my improvements, Figure 2 is a view in transverse section taken on the line 2—2 of Figure 1, and Figure 3 is a view in vertical section taken on the line 3—3 of Figure 2 and drawn to an enlarged scale.

Referring to the drawings by numerals, the back scratching device with which my improvements are more particularly concerned comprises a channel iron frame of inverted U shape and including a pair of side arms 1 and a top stretch 2. The frame is designed to be rigidly mounted between a pair of posts, not shown, fixed in the ground. An arched, brush-carrying, channel iron member 3 is slidably mounted at its ends in said arms 1 so that it is movable upwardly by animals passing under the same. The brush-carrying member 3 has fixed on top thereof a guide bar 4 extending between the arms 1 with its ends slidably mounted therein for upward movement of said bar by said member 3. An oil storage tank 5 is mounted on top of the stretch 2 centrally thereof. An oil discharge pipe 6 depends from said storage tank centrally thereof and terminates above the guide bar 4. The member 3 is perforated, as at 7, to permit oil fed into the channel thereof to drain therethrough into brushes on said member represented by dash lines at 8 in Figure 3.

For a more detailed disclosure of the device, reference may be had to the beforementioned patent.

Coming now to my improvements, a valve casing 9 is provided at the lower end of the oil discharge pipe 6 comprising a bushing 10 threaded onto said lower end, a sleeve 11 threaded onto the bushing and depending therefrom, and a dished nut 12 threaded into the lower end of the sleeve 11 and including a flat bottomed valve seat 13 in the lower part of the casing 9 and a smooth axial bore 14 extending therethrough and forming an oil discharge for said casing.

A bolt-like valve stem 15, smaller in diameter than the bore 14, depends from the nut 12, through the bore 14, with its lower end projecting through a central aperture 16 in the guide bar 4 and bearing in a central depression 17 in the member 3. The valve stem 15 is provided with a flat bottomed head forming a valve member 18 adapted to seat flush on the valve seat 13 to close the bore 14.

A coil spring 19 sleeved onto the stem 15 between the nut 12 and a washer 20 on said stem urges the stem downwardly and the valve member 18 onto the seat 13. A cotter pin 21 extending though the stem 15 supports the washer 20.

The lower end of the oil discharge pipe 6 is internally beveled to form an upper valve seat 22 in said valve casing 9. A ball valve member 23 is provided in said valve casing 9 on top of the valve member 18 for seating against the seat 22 under upward movement of valve member 18 by the stem 15.

As will be manifest, the described ball valve member 23, in the normal position of the parts, is unseated by gravity from the valve seat 22 so that the discharge pipe 6 is normally open to feed oil into the valve casing 9. Under upward movement of the member 3, the valve stem 15 is moved upwardly thereby to elevate the valve member 18 off its seat 13 so that the oil in the casing 9 may discharge through the bore 14 and aperture 16 of guide bar 4 into the channel of the member 3 to escape through the latter to the brushes 8. Upward movement of the stem 15 raises the ball valve member 23 to seat the same and close the discharge pipe 6.

To brace the discharge pipe 6 and incidentally the oil tank 5, a strap iron brace 24 is provided on top of the guide bar 4 and comprises a central part 25 of inverted U shape through which the discharge pipe 6 is slidably extended, and oppositely disposed right angled ends 26 bolted to said bar 4, as at 27. The pipe is braced against accidental flexing, as by workmen in installing the device, or side pressure in shipping, to prevent the same from being bent out of line. The usual upstanding leaf springs 28 provided in the device for engaging the stretch 2 and thereby tensioning the guide bar 4 and member 3 against upward movement are secured to the ends 26 of the brace 24 by the bolts 27.

The foregoing will, it is believed, suffice to impart a clear understanding of my invention without further explanation.

Manifestly, my invention, as described, is susceptible of modification without departing from the inventive concept, and right is herein reserved to such modifications as fall within the scope of the subjoined claim.

What I claim is:

An oil feed control for animal scratching apparatus of the type embodying a frame, an oil storage tank surmounting and fixed to the frame, an oil discharge pipe depending from the tank, and a scratching member upwardly movable in the frame below said pipe, said control comprising a valve casing including a bushing adapted to be threaded onto the lower end of the pipe, a sleeve threaded onto and depending from said bushing, an axially bored flat bottomed member threaded into the lower end of the sleeve and forming a flat valve seat, a bolt-like valve stem of smaller diameter than said bore depending therethrough with the head thereof forming a valve normally seating on said seat to close said bore, said stem being adapted to be moved upwardly by such movement of said member to correspondingly move said head and open said bore, and a ball valve resting on said head and movable upwardly by upward movement of said head and adapted under such movement thereof to seat against the lower end of said pipe and thereby close the same.

RONALD McQUISTAN.